June 11, 1968  C. A. SECKERSON  3,387,342
RESILIENT MOULDING FASTENER
Filed June 27, 1967  2 Sheets-Sheet 1

United States Patent Office 3,387,342
Patented June 11, 1968

3,387,342
RESILIENT MOULDING FASTENER
Clifford Alexander Seckerson, Iver Heath, England, assignor to United-Carr Incorporated, Boston, Mass., a corporation of Delaware
Filed June 27, 1967, Ser. No. 649,329
Claims priority, application Great Britain, July 4, 1966, 29,828/66; Sept. 6, 1966, 39,813/66
8 Claims. (Cl. 24—73)

ABSTRACT OF THE DISCLOSURE

The invention relates to a clip for retaining a bolt within a conventional moulding of the type having inturned longitudinal edges joined by a web. The clip comprises a generally flat base having a slot adapted to receive the shank of the bolt laterally so that the head of the bolt lies on the upper surface of the base and a resilient arm integral with the base and having a portion overlying the base which both limits movement of the bolt axially through the slot and, in assembly in the moulding presses resiliently against the web of the moulding to prevent vibration and provide frictional resistance to movement of the clip lengthwise along the moulding.

---

The present invention relates to an improved clip for retaining a bolt having a head and a shank in a moulding of the type having a pair of internal longitudinal flanges joined by a web.

It is an object of the present invention to provide a clip for retaining a bolt within a conventional moulding.

It is another object of the invention to provide a clip for retaining a bolt in a conventional moulding in such a manner that the clip and the bolt will not slide freely within the moulding, while being manually movable along the moulding.

Figure 1:
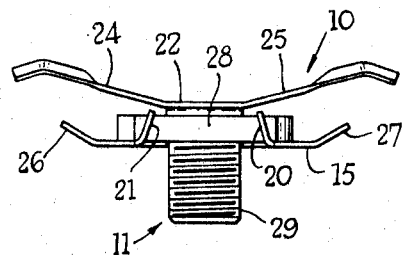
Figure 2:
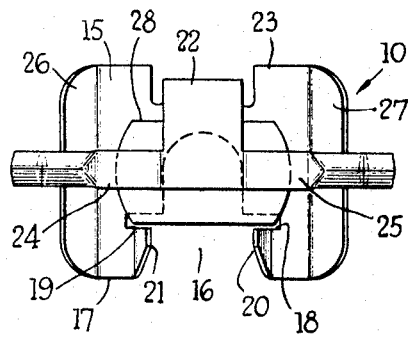
Figure 4:
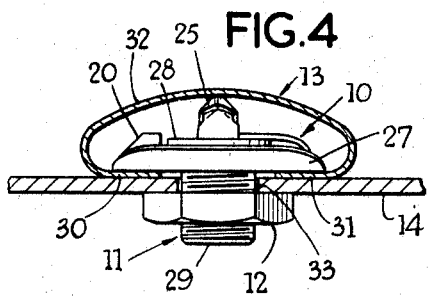
Figure 3:
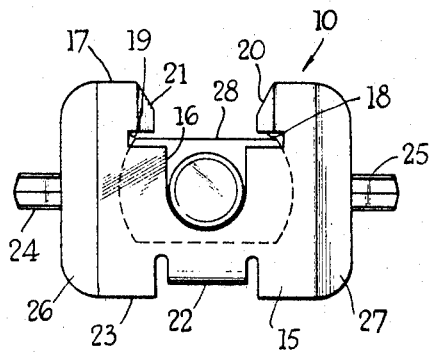
Figure 5:
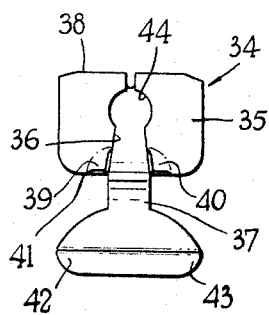
Figure 6:
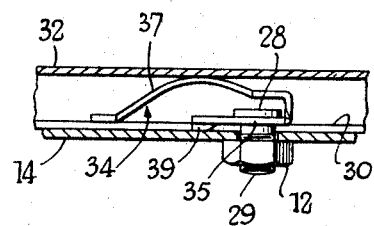
Figure 7:
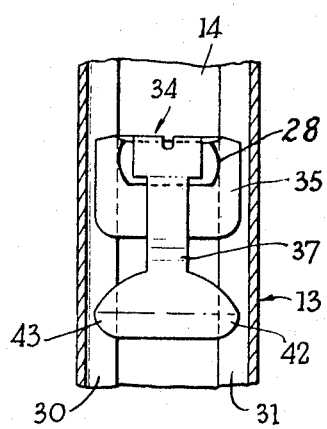

Further objects and advantages of the invention will be apparent from the following description of two preferred embodiments of the invention with reference to the accompanying drawings, in which:

FIGURE 1 is an elevation of a clip according to the invention, with a bolt located in the slot in the base of the clip, FIGURE 2 is a plan view of FIGURE 1, FIGURE 3 is an underplan of FIGURE 1, FIGURE 4 is an elevation, partly in section, showing a moulding secured to a support with the aid of the clip and bolt of FIGURE 1 and a nut, FIGURE 5 is an underplan of a clip forming a further embodiment of the invention, FIGURE 6 is an elevation, partly in section, of a moulding secured to a support with the aid of the clip of FIGURE 5 and a bolt and nut and, FIGURE 7 is a plan view of FIGURE 6 with the moulding partially broken away.

In FIGURES 1 to 4 a resilient metal clip is indicated generally at 10. The clip 10 is shown holding a bolt 11 and the clip and bolt, in combination with a nut 12 are used, as shown in FIGURE 4 to attach a conventional moulding 13 to a support 14.

The clip 10 is manufactured to the shape shown, in any known manner, for instance by shearing and bending from a continuous strip of metal, and is rendered resilient and preferably rustproof in the manufacturing process. In its finished form the clip 10 comprises a substantially flat base 15 formed with a slot 16 extending laterally into one of its longer edges 17. Approximately half-way along the length of the slot two transverse cuts 18 and 19 are formed in the opposite edges of the slot and the material lying between the cuts 18 and 19 and the edge 17 of the base is bent upwardly to form a pair of projections 20 and 21 respectively.

Formed integrally with the base 15 is a resilient arm 22 which extends outwardly from the edge 23 of the base opposite to the edge 17. The arm 22 is reversely bent so as to overlie the end of the slot 16 and is formed at its free end with a pair of oppositely extending wing elements 24 and 25 which are inclined upwardly away from the base 15.

The shorter edges of the base 15 are bent upwardly to form inclined flanges 26 and 27.

The bolt 11 which comprises a non-circular head 28 and a threaded shank 29 is attached to the clip 10 by inclining the head 28 to the plane of the base 11 and forcing the head laterally beneath the arm 22. In order to get the head past the projections 20, 21 the arm 22 has to be forced upwardly but thereafter returns to its normal unstressed position in which it is spaced from the upper surface of the bolt head 28. As the head is slid into position beneath the arm 22 the bolt shank 29 is passed laterally along the slot 16 and, in the assembled position the bolt is retained in the clip by the projections 20, 21, which prevent lateral removal of the bolt head 28, and by the arm 22 which overlies the bolt head 28 and limits axial movement of the bolt.

The moulding 13 is attached to the support 14 in the following manner.

The moulding 13 is formed with two inturned longitudinal flanges 30 and 31, which are joined by a curved web portion 32. The gap between the facing edges of the flanges 30 and 31 is substantially less than the width of the base 15 of the clip and the maximum internal height of the moulding, measured from the plane of the upper surfaces of the flanges to the apex of the web portion 32, is less than the maximum height of the clip 10, measured from the upper surface of either wing element 24 or 25 to the plane of the undersurface of the base 11. The clip 10, with the bolt in position in the clip, is inserted lengthwise into the moulding, as shown in FIGURE 4, thereby compressing the wing elements 24 and 25 towards the base 11. Thereafter the wing elements 24 and 25 provide frictional resistance to sliding movement of the clip along the moulding, but this resistance can be overcome manually for positional adjustment of the clip and bolt in the moulding.

The bolt shank 29 which now projects from between the flanges 30, 31 of the moulding is brought up to the support 14 and passed through a receiving aperture 33 formed therein. Finally, the nut 12 is tightened home on the bolt shank to secure the moulding 13 to the support 14. The bolt 11 is prevented from rotating when torque is applied to the shank by engagement of the bolt head 28 against the arm 22 and the projections 20, 21.

A plurality of clips 10 will normally be used in the moulding 13 and it is thus advantageous that each clip is prevented from sliding freely within the moulding but is positionally adjustable, by hand, to locate its associated bolt shank opposite the receiving aperture in the support.

A clip forming a second embodiment of the invention is indicated generally at 34 in FIGURES 5 to 7. The clip 34 is manufactured in the same manner as the clip 10 of FIGURES 1 to 4 and is used for the same purpose, as shown in FIGURES 6 and 7, to retain the bolt 11 in the moulding 13 and, with the aid of the bolt 11 and nut 12, to secure the moulding 13 to the support 14.

The clip 34 comprises a substantially flat base 35 formed with a slot 36 which extends across the base and into a resilient arm 37 which is integral with the base and which extends from an edge 38 of the base. The slot 36 is formed with facing arcuate recesses intermediate its length which form a part-circular seat 44 for the shank 29 of the bolt 11. The corners at the entry end of the slot are bent downwardly out of the plane of the base to form prongs 39, 40. The arm 37 is reversely bent so that it overlies the slot 36 in the base and extends beyond the edge 41 of the base opposite to the edge 38. The arm 37 is bowed downwardly and its free end, which is formed with outwardly extending wing elements 42, 43 is located in approximately the same plane as the base, when the arm is unstressed.

In order to locate the bolt 11 in the clip 10, the shank 29 of the bolt is slid along the slot 36, which as can be seen from FIGURE 5 is tapered towards the seat 44, and snap-engaged into the seat 44 with the bolt head 28 located on the upper surface of the base 35. The two portions of the base 35, which lie on either side of the slot 36, can be resiliently prised apart to accept the shank because the slot 36 extends into the arm 37 which thereby acts as a spring for the base 35.

When the bolt is in position, the clip is slid lengthwise into the moulding 13, with the prongs 39, 40 located between the flanges 30, 31 of the moulding and aligning the clip in the moulding. When the clip is inserted the arm 37 is flattened slightly between the web 32 and the flanges 30, 31 of the moulding and is thereby placed under permanent tension. The arm 37 thus provides frictional resistance to movement of the clip and bolt along the moulding, which is sufficient to prevent free sliding of the clip within the moulding but which can be overcome by hand.

When the clip 34 and its associated bolt are located in the moulding, or a plurality of such clip and bolts, the moulding is brought up to the support 14, the or each bolt shank is passed through a receiving aperture and a nut threaded home on the or each bolt shank to clamp the moulding against the support.

Further modifications may be made to the embodiment illustrated in the accompanying drawings without departing from the spirit and scope of the invention which is defined in the following claims.

What I claim is:

1. A resilient clip for retaining a bolt having a shank and a head in an elongate moulding which is formed with a web joining a pair of inturned longitudinal flanges having spaced facing edges, the clip comprising a generally flat base the width of which is greater than the gap between the facing edges of the flanges of the moulding, a resilient pressure member overlying the base and formed integrally therewith, and adapted to engage the web of the moulding to resiliently press the base against the flanges, a slot extending into the base from an edge thereof and adapted to receive the shank of the bolt and means on the base for resisting withdrawal of the bolt laterally from the slot.

2. A clip as claimed in claim 1, wherein the said means comprises a pair of projections extending upwardly from the base towards the pressure member and adapted to engage the head of the bolt when the head of the bolt is located on the base with the shank extending through the slot to resist withdrawal of the bolt laterally from the slot.

3. A clip as claimed in claim 2, wherein the pressure member comprises an extension of the base in the form of an arm which is reversely bent so as to overlie the end portion of the slot, thereby limiting axial movement of the bolt in one direction through the slot.

4. A clip as claimed in claim 3, wherein the said arm is provided with a pair of oppositely extending wing elements adapted to engage the web of the molding.

5. A clip as claimed in claim 1, wherein the said means comprises a pair of facing shoulders which reduce the width of the slot intermediate its length thereby forming a neck portion in the slot.

6. A clip as claimed in claim 5, wherein the pressure member comprises an extension of the base in the form of an arm which is reversely bent so as to overlie the length of the slot, the arm being bowed concavely towards the base.

7. A clip as claimed in claim 6, wherein the end of the arm is formed with a pair of oppositely directed lugs spaced laterally from and lying approximately in the same general plane as the base when the arm is unstressed the lugs being adapted to engage the said flanges of the moulding when the clip is located within the moulding.

8. A clip as claimed in claim 7, wherein the outer corners of the slot are bent downwardly from the base to form prongs adapted to locate between the flanges of the moulding to positionally locate and guide the clip within the moulding.

References Cited

UNITED STATES PATENTS

| | | | |
|---|---|---|---|
| 1,933,724 | 11/1933 | Fox | 24—224 |
| 2,291,674 | 8/1942 | Alden | 24—224 |
| 2,345,650 | 4/1944 | Attwood | 151—41.75 |
| 2,531,351 | 11/1950 | Churchill. | |
| 2,632,929 | 3/1953 | Poupitch | 151—41.71 |
| 2,636,414 | 4/1953 | Bedford. | |
| 2,767,609 | 10/1956 | Cousino | 151—41.75 |
| 2,820,270 | 1/1958 | Scott. | |
| 2,888,971 | 2/1959 | Wootton | 151—41.75 |
| 2,962,783 | 12/1960 | Elder. | |

MARION PARSONS, Jr., *Primary Examiner.*

CARL W. TOMLIN, *Examiner.*